US012660010B2

(12) United States Patent
Gao et al.

(10) Patent No.: US 12,660,010 B2
(45) Date of Patent: Jun. 16, 2026

(54) METHOD AND APPARATUS FOR QUICKLY ESTABLISHING COMMUNICATION, DEVICE AND STORAGE MEDIUM

(71) Applicant: ZTE CORPORATION, Shenzhen (CN)

(72) Inventors: Minggang Gao, Shenzhen (CN); Xuemei Ding, Shenzhen (CN); Ying Xu, Shenzhen (CN); Mingye Wei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 366 days.

(21) Appl. No.: 18/037,085

(22) PCT Filed: Jun. 15, 2021

(86) PCT No.: PCT/CN2021/100110
§ 371 (c)(1),
(2) Date: May 16, 2023

(87) PCT Pub. No.: WO2022/100090
PCT Pub. Date: May 19, 2022

(65) Prior Publication Data
US 2024/0023173 A1    Jan. 18, 2024

(30) Foreign Application Priority Data
Nov. 16, 2020    (CN) .......................... 202011275795.9

(51) Int. Cl.
*H04W 76/10*        (2018.01)
*H04W 72/0446*      (2023.01)
*H04W 72/1268*      (2023.01)

(52) U.S. Cl.
CPC ....... *H04W 76/10* (2018.02); *H04W 72/0446* (2013.01); *H04W 72/1268* (2013.01)

(58) Field of Classification Search
CPC ............. H04W 76/10; H04W 72/0446; H04W 72/1268
See application file for complete search history.

(56) References Cited

U.S. PATENT DOCUMENTS

2015/0312930 A1    10/2015    Han et al.
2019/0132882 A1*    5/2019    Li ....................... H04L 27/2605
(Continued)

FOREIGN PATENT DOCUMENTS

CN        109068390 A    12/2018
CN        109275200 A     1/2019
(Continued)

OTHER PUBLICATIONS

Japanese Notice of Reasons for Refusal dated Apr. 2, 2024 in corresponding Japanese Application No. 2023-528687, translated, 7 pages.
(Continued)

*Primary Examiner* — Michael Thier
*Assistant Examiner* — Nevena Zecevic Sandhu
(74) *Attorney, Agent, or Firm* — MH2 Technology Law Group LLP

(57)    ABSTRACT

The present disclosure provides a method and apparatus for quickly establishing communication, a device, and a storage medium. The method may include: in a non-standalone formed by a first standard network and a second standard network, a terminal determining whether a communication request to be sent to the first standard network is currently present; in a case where it is determined that the communication request to be sent to the first standard network is currently present, the terminal sending the communication request to the first standard network by using either of a current uplink resource of the first standard network and a current uplink resource of the second standard network; and
(Continued)

A terminal determines whether a communication request to be sent to the first standard network is currently present, in a non-standalone formed by a first standard network and a second standard network ⟶ S101

The terminal sends the communication request to the first standard network by using either of a current uplink resource of the first standard network and a current uplink resource of the second standard network, if it is determined that the communication request to be sent to the first standard network is currently present ⟶ S102

The terminal receives, through the first standard network, a communication response sent by the first standard network in response to the communication request, after the communication request is sent to the first standard network ⟶ S103 after the communication request is sent to the first standard network, the terminal receiving, through the first standard network, a communication response sent by the first standard network in response to the communication request.

16 Claims, 9 Drawing Sheets

(56)                    References Cited

U.S. PATENT DOCUMENTS

| | | | |
|---|---|---|---|
| 2020/0136751 A1* | 4/2020 | Guo ................. | H04L 27/26025 |
| 2021/0126753 A1 | 4/2021 | Mochizuki et al. | |

FOREIGN PATENT DOCUMENTS

| | | | |
|---|---|---|---|
| EP | 3684116 A1 | 7/2020 |
| JP | 2017513306 A | 5/2017 |
| KR | 20200017711 A | 2/2020 |
| WO | 2016101194 A1 | 6/2016 |
| WO | 2017127126 A1 | 7/2017 |
| WO | 2019098059 A1 | 5/2019 |
| WO | 2019236458 A1 | 12/2019 |

OTHER PUBLICATIONS

International Search Report of PCT Patent Application No. PCT/CN2021/100110 issued on Jul. 26, 2021.
Chinese Notification of the First Office Action dated Jun. 29, 2024 in corresponding Chinese Application No. 202011275795.9, translated, 12 pages.
European Extended Search Report mailed Sep. 10, 2024 in corresponding European Application No. 21890621.2, 10 pages.

* cited by examiner

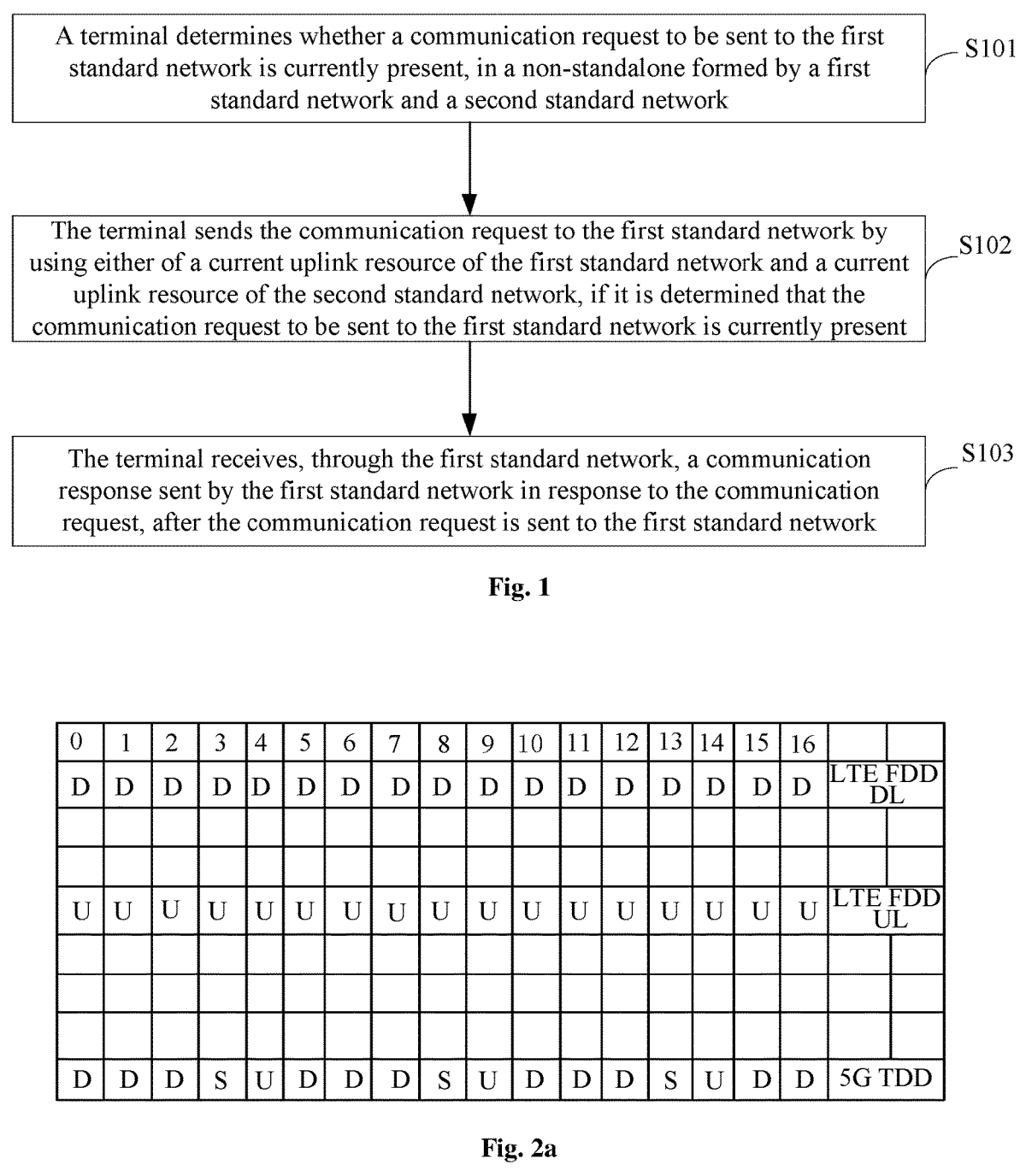

| A terminal determines whether a communication request to be sent to the first standard network is currently present, in a non-standalone formed by a first standard network and a second standard network | ⌐ S101 |

| The terminal sends the communication request to the first standard network by using either of a current uplink resource of the first standard network and a current uplink resource of the second standard network, if it is determined that the communication request to be sent to the first standard network is currently present | ⌐ S102 |

| The terminal receives, through the first standard network, a communication response sent by the first standard network in response to the communication request, after the communication request is sent to the first standard network | ⌐ S103 |

Fig. 1

| 0 | 1 | 2 | 3 | 4 | 5 | 6 | 7 | 8 | 9 | 10 | 11 | 12 | 13 | 14 | 15 | 16 | |
|---|---|---|---|---|---|---|---|---|---|----|----|----|----|----|----|----|---|
| D | D | D | D | D | D | D | D | D | D | D | D | D | D | D | D | D | LTE FDD DL |
| | | | | | | | | | | | | | | | | | |
| | | | | | | | | | | | | | | | | | |
| U | U | U | U | U | U | U | U | U | U | U | U | U | U | U | U | U | LTE FDD UL |
| | | | | | | | | | | | | | | | | | |
| | | | | | | | | | | | | | | | | | |
| | | | | | | | | | | | | | | | | | |
| D | D | D | S | U | D | D | D | S | U | D | D | D | S | U | D | D | 5G TDD |

Fig. 2a

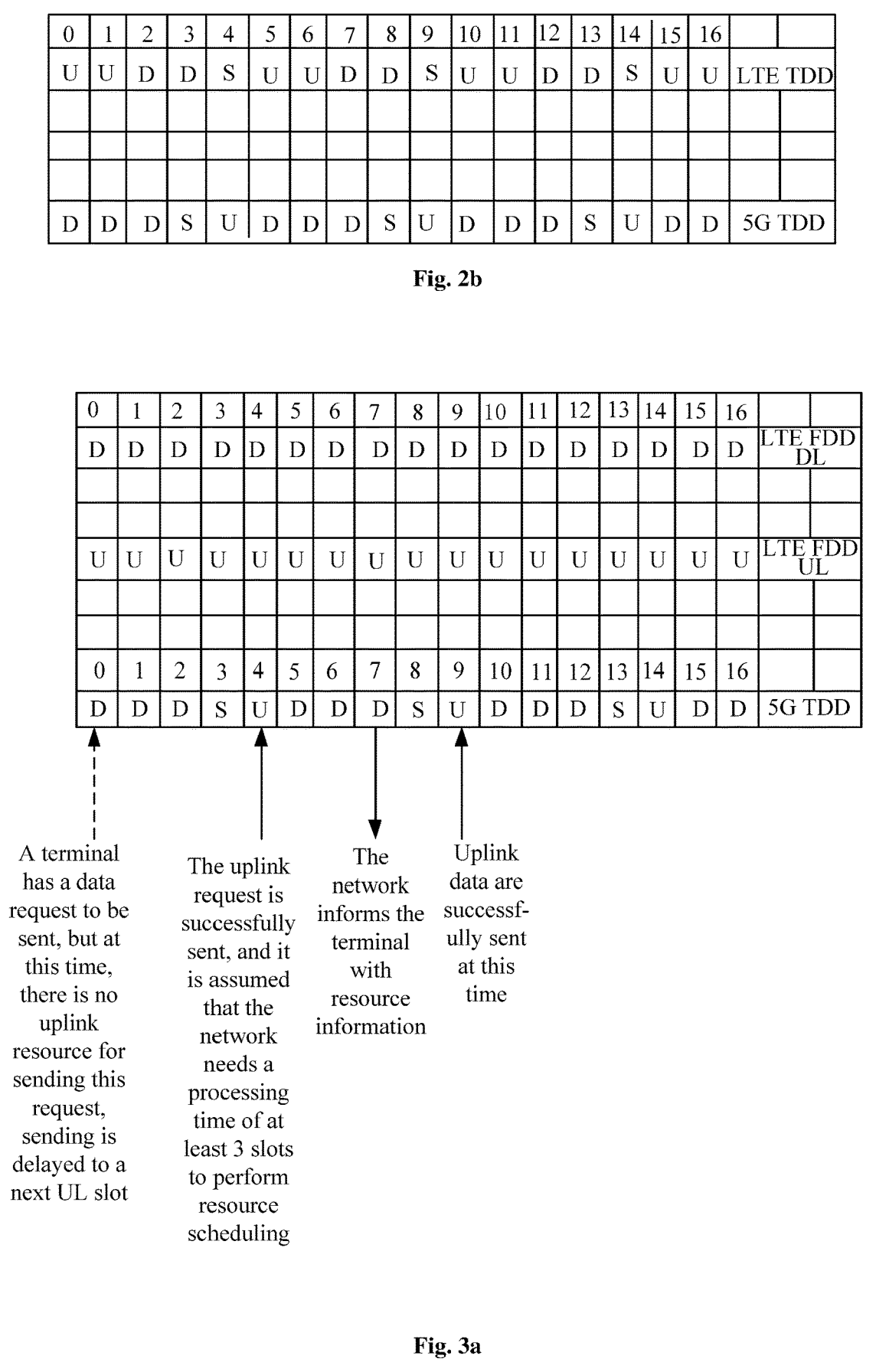

| 0 | 1 | 2 | 3 | 4 | 5 | 6 | 7 | 8 | 9 | 10 | 11 | 12 | 13 | 14 | 15 | 16 | | |
|---|---|---|---|---|---|---|---|---|---|----|----|----|----|----|----|----|---|---|
| U | U | D | D | S | U | U | D | D | S | U | U | D | D | S | U | U | LTE TDD | |
| | | | | | | | | | | | | | | | | | | |
| | | | | | | | | | | | | | | | | | | |
| | | | | | | | | | | | | | | | | | | |
| D | D | D | S | U | D | D | D | S | U | D | D | D | S | U | D | D | 5G TDD | |

Fig. 2b

| 0 | 1 | 2 | 3 | 4 | 5 | 6 | 7 | 8 | 9 | 10 | 11 | 12 | 13 | 14 | 15 | 16 | | |
|---|---|---|---|---|---|---|---|---|---|----|----|----|----|----|----|----|---|---|
| D | D | D | D | D | D | D | D | D | D | D | D | D | D | D | D | D | LTE FDD DL | |
| | | | | | | | | | | | | | | | | | | |
| | | | | | | | | | | | | | | | | | | |
| U | U | U | U | U | U | U | U | U | U | U | U | U | U | U | U | U | LTE FDD UL | |
| | | | | | | | | | | | | | | | | | | |
| | | | | | | | | | | | | | | | | | | |
| 0 | 1 | 2 | 3 | 4 | 5 | 6 | 7 | 8 | 9 | 10 | 11 | 12 | 13 | 14 | 15 | 16 | | |
| D | D | D | S | U | D | D | D | S | U | D | D | D | S | U | D | D | 5G TDD | |

A terminal has a data request to be sent, but at this time, there is no uplink resource for sending this request, sending is delayed to a next UL slot The uplink request is successfully sent, and it is assumed that the network needs a processing time of at least 3 slots to perform resource scheduling The network informs the terminal with resource information Uplink data are successfully sent at this time

Fig. 3a

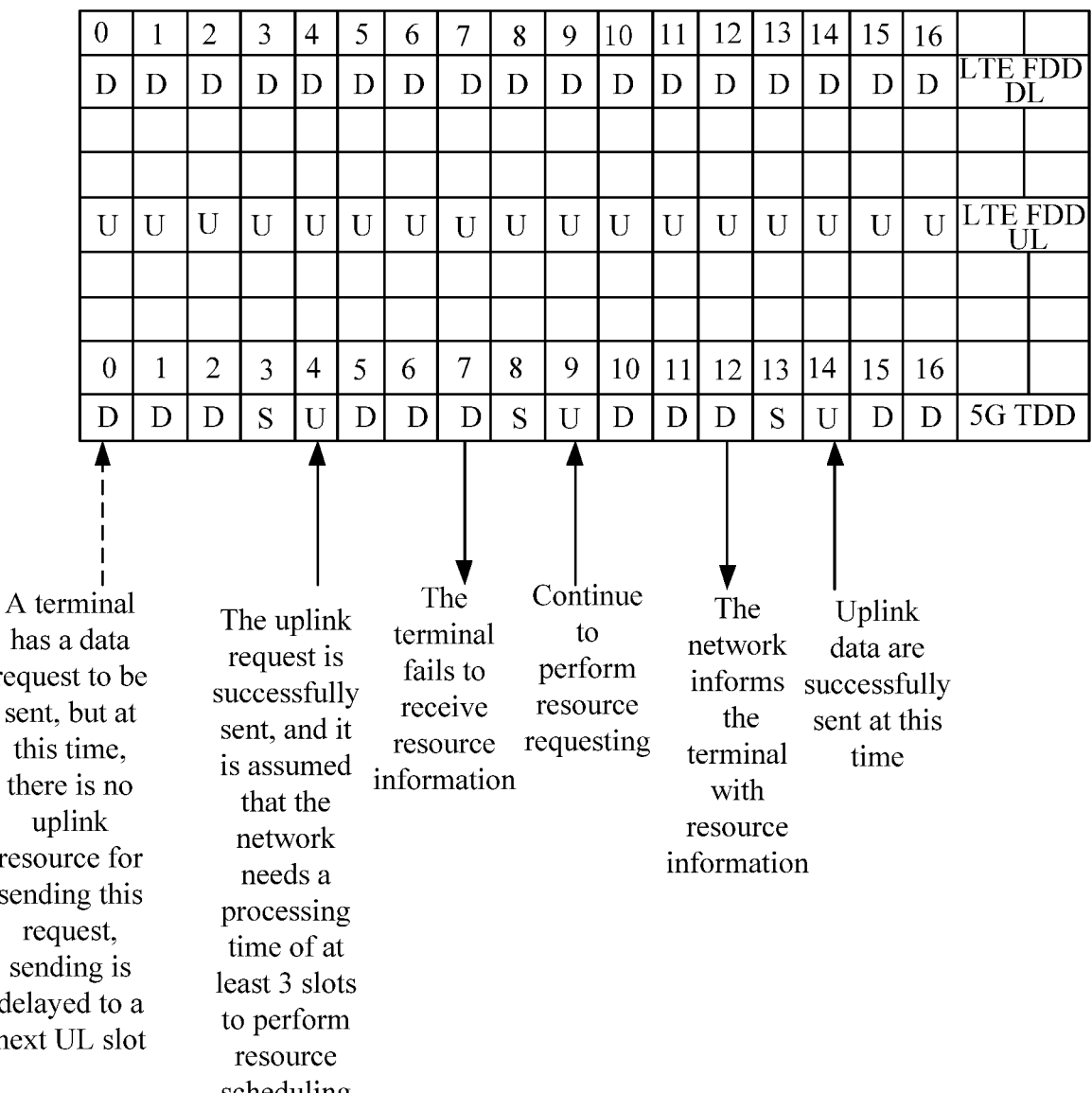

| 0 | 1 | 2 | 3 | 4 | 5 | 6 | 7 | 8 | 9 | 10 | 11 | 12 | 13 | 14 | 15 | 16 | | |
|---|---|---|---|---|---|---|---|---|---|----|----|----|----|----|----|----|---|---|
| D | D | D | D | D | D | D | D | D | D | D | D | D | D | D | D | D | LTE FDD DL | |
| | | | | | | | | | | | | | | | | | | |
| | | | | | | | | | | | | | | | | | | |
| U | U | U | U | U | U | U | U | U | U | U | U | U | U | U | U | U | LTE FDD UL | |
| | | | | | | | | | | | | | | | | | | |
| | | | | | | | | | | | | | | | | | | |
| 0 | 1 | 2 | 3 | 4 | 5 | 6 | 7 | 8 | 9 | 10 | 11 | 12 | 13 | 14 | 15 | 16 | | |
| D | D | D | S | U | D | D | D | S | U | D | D | D | S | U | D | D | 5G TDD | |

A terminal has a data request to be sent, but at this time, there is no uplink resource for sending this request, sending is delayed to a next UL slot The uplink request is successfully sent, and it is assumed that the network needs a processing time of at least 3 slots to perform resource scheduling The terminal fails to receive resource information Continue to perform resource requesting The network informs the terminal with resource information Uplink data are successfully sent at this time

Fig. 3b

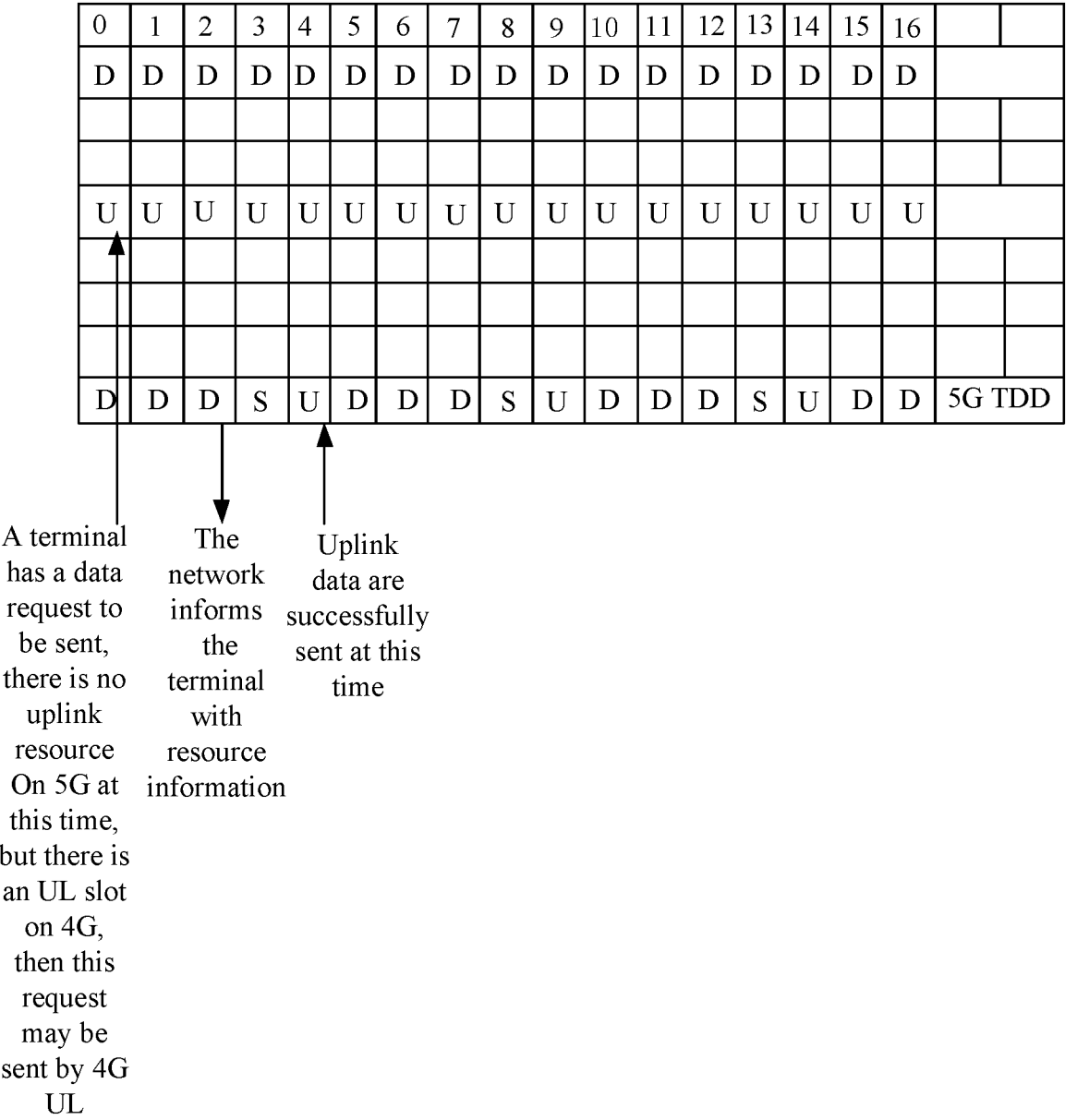

| 0 | 1 | 2 | 3 | 4 | 5 | 6 | 7 | 8 | 9 | 10 | 11 | 12 | 13 | 14 | 15 | 16 | | |
|---|---|---|---|---|---|---|---|---|---|----|----|----|----|----|----|----|---|---|
| D | D | D | D | D | D | D | D | D | D | D | D | D | D | D | D | D | | |
| | | | | | | | | | | | | | | | | | | |
| | | | | | | | | | | | | | | | | | | |
| U | U | U | U | U | U | U | U | U | U | U | U | U | U | U | U | U | | |
| | | | | | | | | | | | | | | | | | | |
| | | | | | | | | | | | | | | | | | | |
| | | | | | | | | | | | | | | | | | | |
| D | D | D | S | U | D | D | D | S | U | D | D | D | S | U | D | D | 5G TDD | |

A terminal has a data request to be sent, there is no uplink resource On 5G at this time, but there is an UL slot on 4G, then this request may be sent by 4G UL The network informs the terminal with resource information Uplink data are successfully sent at this time

| Cross-standard scheduling instruction | Initial request information |
|---|---|

Fig. 5a

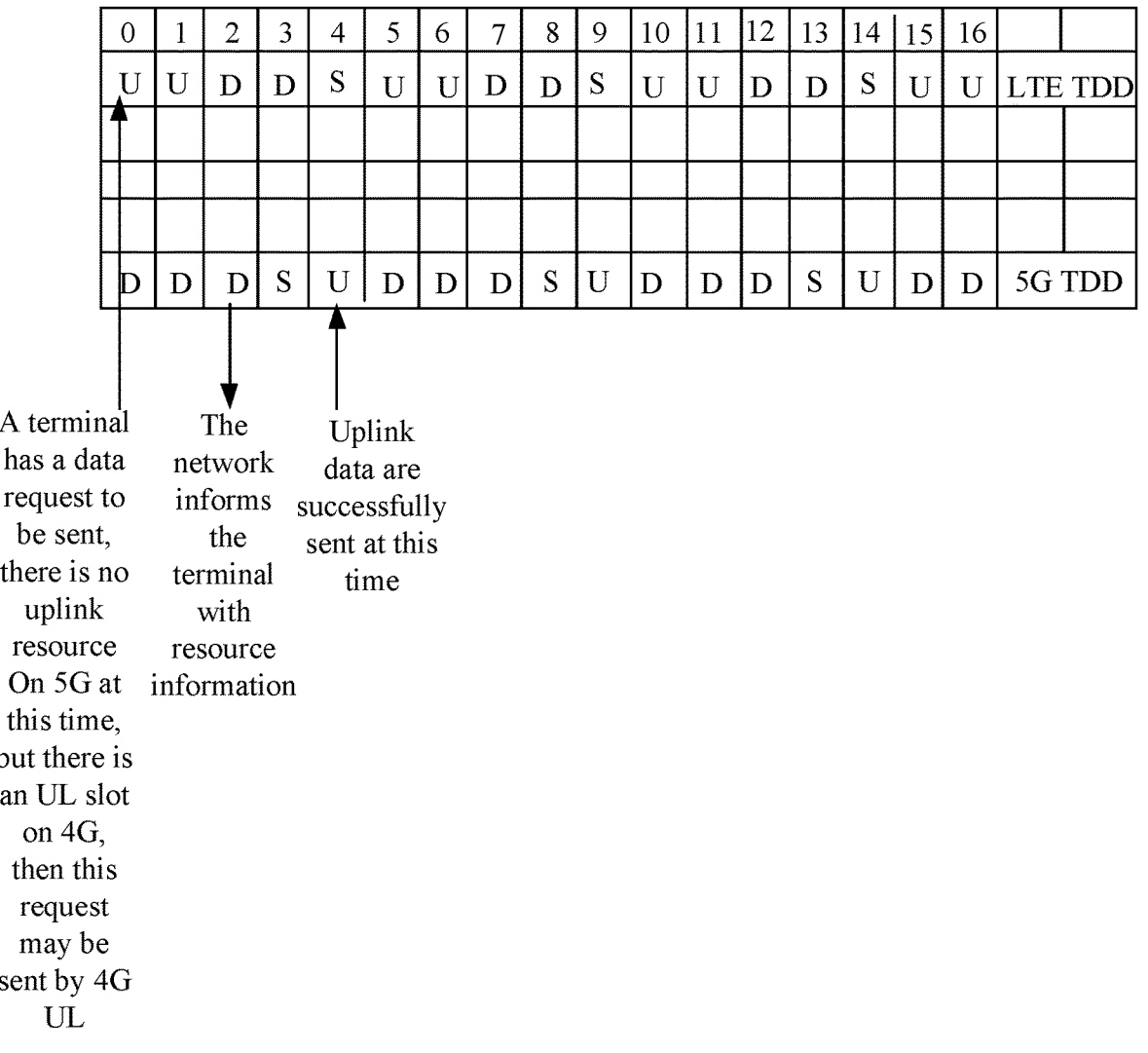

| 0 | 1 | 2 | 3 | 4 | 5 | 6 | 7 | 8 | 9 | 10 | 11 | 12 | 13 | 14 | 15 | 16 | | |
|---|---|---|---|---|---|---|---|---|---|----|----|----|----|----|----|----|---|---|
| U | U | D | D | S | U | U | D | D | S | U | U | D | D | S | U | U | LTE TDD |
| | | | | | | | | | | | | | | | | | |
| | | | | | | | | | | | | | | | | | |
| | | | | | | | | | | | | | | | | | |
| D | D | D | S | U | D | D | D | S | U | D | D | D | S | U | D | D | 5G TDD |

A terminal          The          Uplink
has a data          network      data are
request to          informs      successfully
be sent,            the          sent at this
there is no         terminal     time
uplink              with
resource            resource
On 5G at            information
this time,
but there is
an UL slot
on 4G,
then this
request
may be
sent by 4G
UL

| Cross-standard scheduling instruction | Initial request information |
|---|---|

Fig. 5b

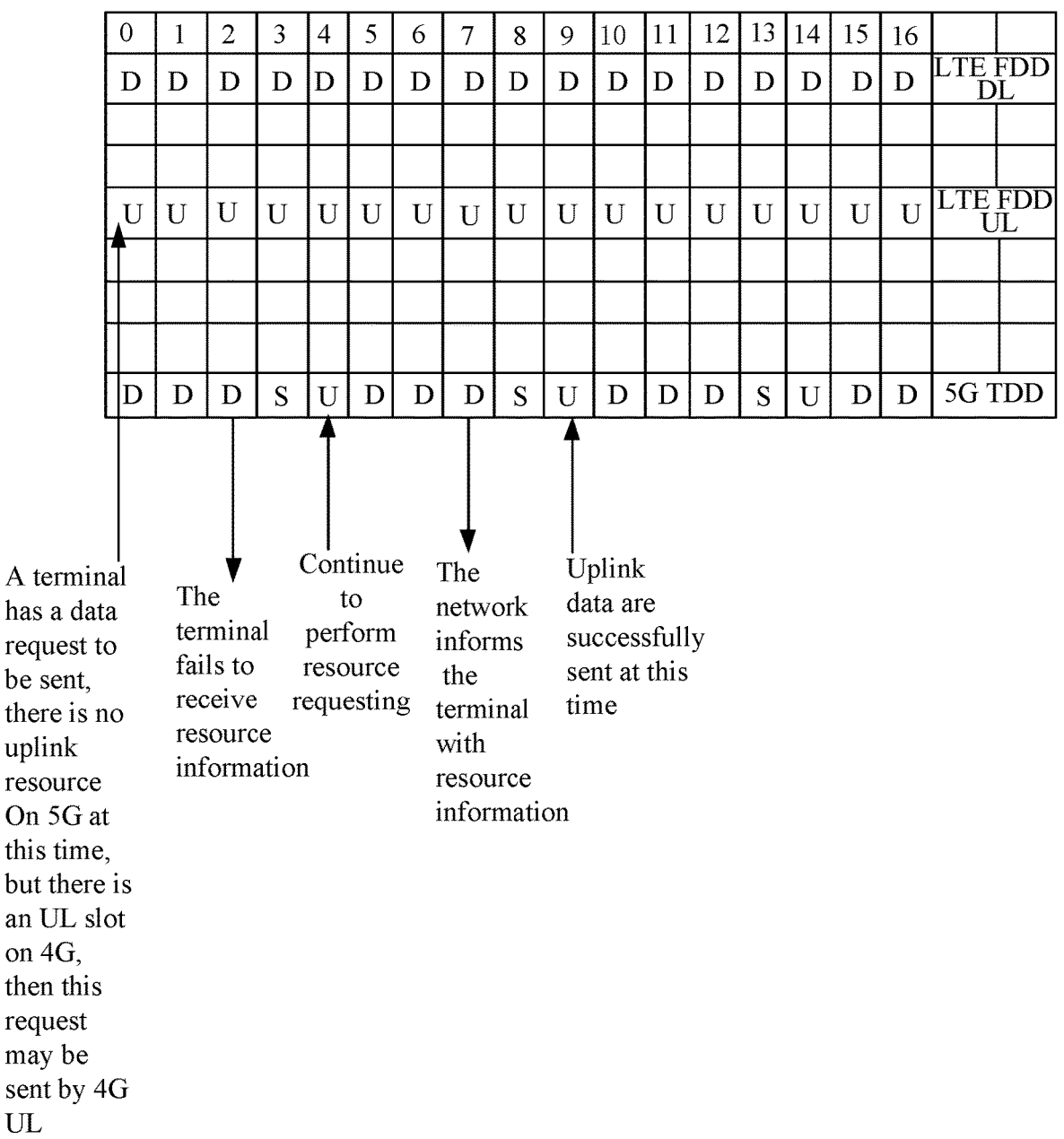

| 0 | 1 | 2 | 3 | 4 | 5 | 6 | 7 | 8 | 9 | 10 | 11 | 12 | 13 | 14 | 15 | 16 | | |
|---|---|---|---|---|---|---|---|---|---|----|----|----|----|----|----|----|---|---|
| D | D | D | D | D | D | D | D | D | D | D | D | D | D | D | D | D | LTE FDD DL | |
| | | | | | | | | | | | | | | | | | | |
| | | | | | | | | | | | | | | | | | | |
| U | U | U | U | U | U | U | U | U | U | U | U | U | U | U | U | U | LTE FDD UL | |
| | | | | | | | | | | | | | | | | | | |
| | | | | | | | | | | | | | | | | | | |
| | | | | | | | | | | | | | | | | | | |
| D | D | D | S | U | D | D | D | S | U | D | D | D | S | U | D | D | 5G TDD | |

A terminal has a data request to be sent, there is no uplink resource On 5G at this time, but there is an UL slot on 4G, then this request may be sent by 4G UL The terminal fails to receive resource information Continue to perform resource requesting The network informs the terminal with resource information Uplink data are successfully sent at this time

| Cross-standard scheduling instruction | Initial request information |
|---|---|

Fig. 6a

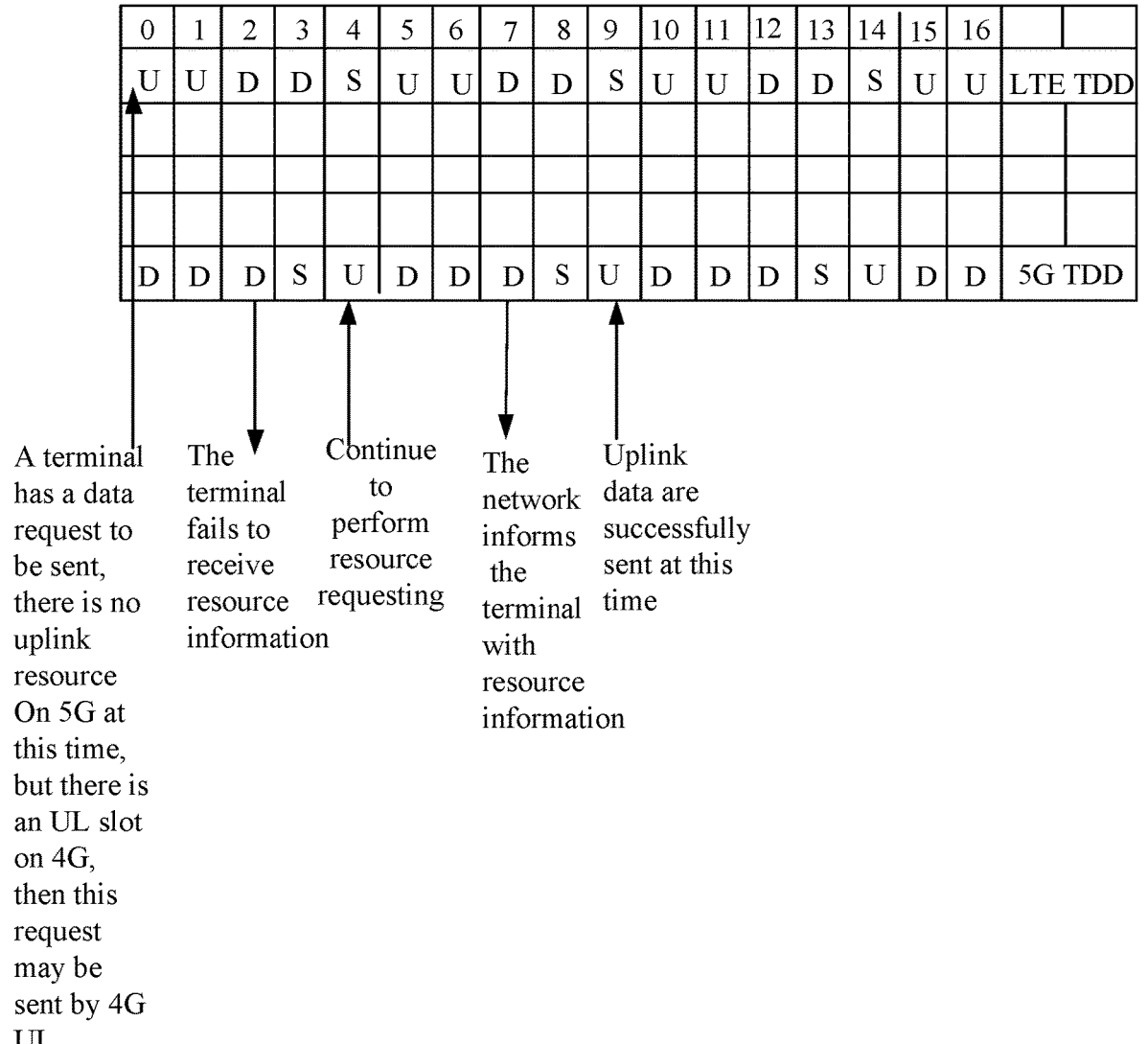

| 0 | 1 | 2 | 3 | 4 | 5 | 6 | 7 | 8 | 9 | 10 | 11 | 12 | 13 | 14 | 15 | 16 | | |
|---|---|---|---|---|---|---|---|---|---|----|----|----|----|----|----|----|---|---|
| U | U | D | D | S | U | U | D | D | S | U | U | D | D | S | U | U | LTE TDD |
| | | | | | | | | | | | | | | | | | |
| | | | | | | | | | | | | | | | | | |
| D | D | D | S | U | D | D | D | S | U | D | D | D | S | U | D | D | 5G TDD |

A terminal has a data request to be sent, there is no uplink resource On 5G at this time, but there is an UL slot on 4G, then this request may be sent by 4G UL The terminal fails to receive resource information Continue to perform resource requesting The network informs the terminal with resource information Uplink data are successfully sent at this time

| Cross-standard scheduling instruction | Initial request information |
|---|---|

Fig. 6b

METHOD AND APPARATUS FOR QUICKLY ESTABLISHING COMMUNICATION, DEVICE AND STORAGE MEDIUM

CROSS-REFERENCE TO RELATED APPLICATIONS

This application is a national phase application of the international application PCT/CN2021/100110 filed on Jun. 15, 2021, under 35 U.S.C. § 371, and claims the priority of Chinese patent application CN 202011275795.9, entitled "METHOD AND APPARATUS FOR QUICKLY ESTAB-LISHING COMMUNICATION, DEVICE AND STOR-AGE MEDIUM" and filed on Nov. 16, 2020, the entirety of which is incorporated herein by reference.

FIELD

The present disclosure relates to the field of communication, and in particular to a method and apparatus for quickly establishing communication, a device and a storage medium.

BACKGROUND

Since a large bandwidth is required in 5G technology, TDD (Time Division Duplexing) technology will uncharac-teristically play a dominant role in 5G to save wireless spectrum and expenditure of channel quality reporting. In current commercial 5G technology and frequency band definition of 3GPP (3rd Generation Partnership Project), TDD accounts for at least 80% of share.

Although TDD has many advantages applied in 5G, it has an inherent defect in which only uplink or downlink resource scheduling or data transmission is performed at certain duration. This is, TDD has an inherent defect in timely information transmission, and this defect cannot be overcome. However, FDD (Frequency Division Duplexing) has an inherent advantage in real-time information trans-mission.

At present, NSA (Non Standalone) FDD and TDD net-working types are adopted by most global operators, that is, FDD is mostly adopted for LTE while TDD is mostly adopted on a 5G side. Especially for a future URLLC (Ultra-reliable and Low Latency Communications) field having very-high requirements on latency during commu-nication establishment, if long latency of TDD for commu-nication establishment cannot be overcome, it will be a severe obstacle in corresponding industry fields.

SUMMARY

An embodiment of the present disclosure provides a method and apparatus for quickly establishing communica-tion, a device and a storage medium.

An embodiment of the present disclosure provides a method for quickly establishing communication, and the method for quickly establishing communication may include: determining, in a non-standalone formed by a first standard network and a second standard network, whether a communication request to be sent to the first standard network is currently present; sending the communication request to the first standard network by using either of a current uplink resource of the first standard network and a current uplink resource of the second standard network, in a case where it is determined that the communication request to be sent to the first standard network is currently present; and receiving, through the first standard network, a communication response sent by the first standard network in response to the communication request, after the communi-cation request is sent to the first standard network.

An embodiment of the present disclosure further provides a device for quickly establishing communication, and the device for quickly establishing communication may include: a memory, a processor, and a program stored in the memory and capable of running on the processor, and when the program is executed by the processor, the method as described above is implemented.

The present disclosure further provides a storage medium for computer readable storage, the storage medium stores at least one program(s) executed by at least one or more processor(s) to implement the method as described above.

BRIEF DESCRIPTION OF THE DRAWINGS

FIG. 1 is a schematic flowchart of a method for quickly establishing communication, provided in an embodiment of the present disclosure;

FIG. 2a is a schematic diagram of a frame structure combination in an LTE FDD and 5G TDD combinatorial network;

FIG. 2b is a schematic diagram of a frame structure combination in an LTE TDD and 5G TDD combinatorial network;

FIG. 3a is a schematic timing diagram when a terminal uploads data, in a scenario without retransmission in the art;

FIG. 3b is a schematic timing diagram when a terminal uploads data, in a scenario with retransmission in the art;

FIG. 5a is a schematic timing diagram when a terminal uploads data, in a scenario without retransmission in a LTE FDD and 5G TDD combinatorial network, provided in an embodiment of the present disclosure;

FIG. 5b is a schematic timing diagram when a terminal uploads data, in a scenario without retransmission in a LTE TDD and 5G TDD combinatorial network, provided in an embodiment of the present disclosure;

FIG. 6a is a schematic timing diagram when a terminal uploads data, in a scenario with retransmission in a LTE FDD and 5G TDD combinatorial network, provided in an embodiment of the present disclosure;

FIG. 6b is a schematic timing diagram when a terminal uploads data, in a scenario with retransmission in a LTE TDD and 5G TDD combinatorial network, provided in an embodiment of the present disclosure;

DETAILED DESCRIPTION OF THE EMBODIMENTS

Figure 4:
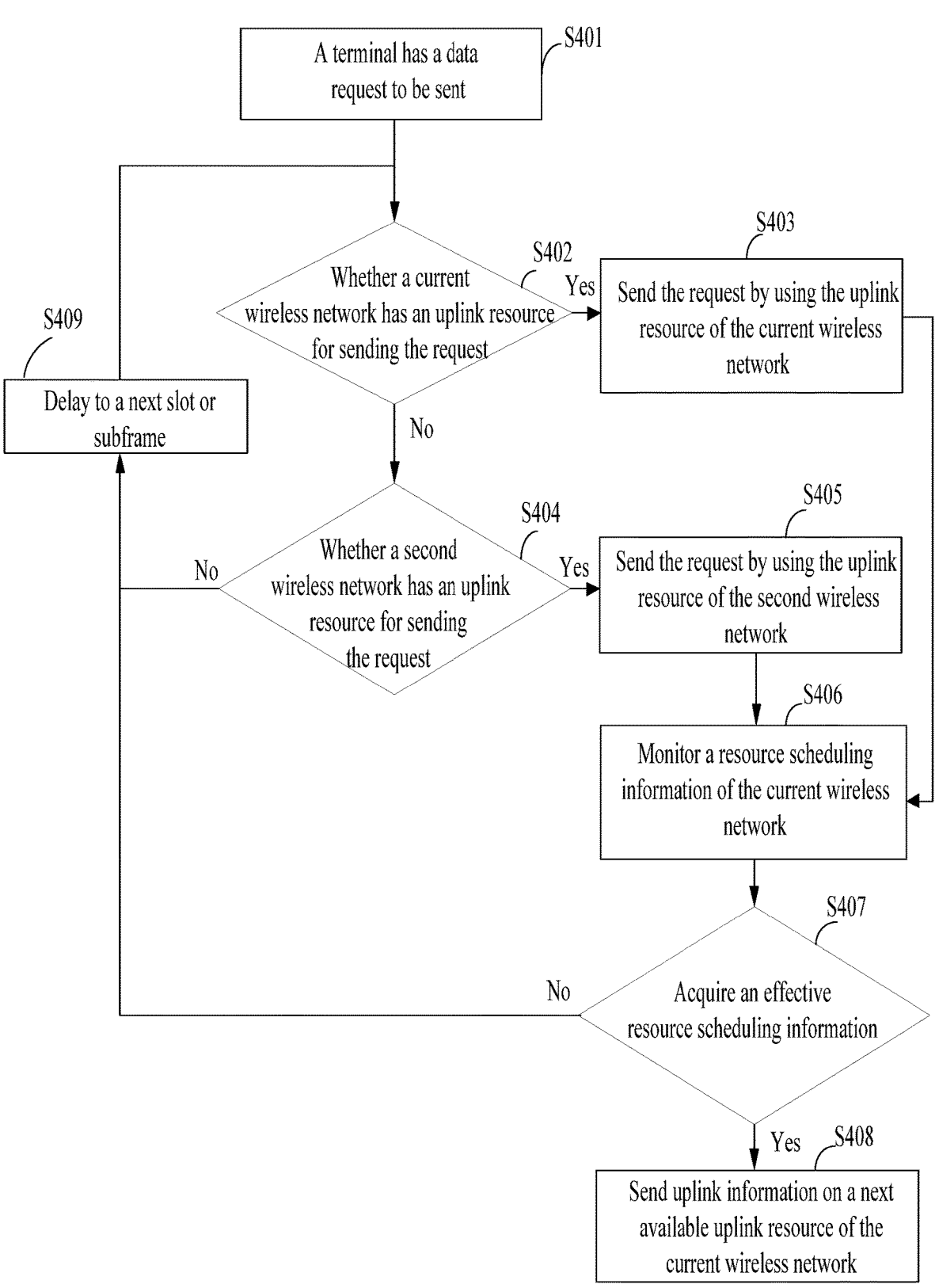
FIG. 4 is a flowchart of establishing and performing communication between a terminal and a network in an NSA environment, provided in an embodiment of the pres-ent disclosure.

It should be understood that the specific embodiments described herein are only used to explain the present dis-closure, and are not intended to limit the present disclosure.

In subsequent description, suffixes such as "module", "component" or "unit" for representing elements are only used to facilitate illustration of the present disclosure, and do not have a specific meaning. Therefore, the "module", "component" or "unit" may be used in a mixed manner.

In an embodiment of the present disclosure, different frame structures of two different networks in NSA are used to enhance efficiency of communication establishment and to reduce communication latency, such that communication latency of 5G TDD reach to that of FDD approximatively, which is suitable for 5G terminals and corresponding networks.

FIG. 1 is a schematic flowchart of a method for quickly establishing communication, provided in an embodiment of the present disclosure. As shown in FIG. 1, the method may include step S101 to step S103.

At step S101, a terminal determines whether a communication request to be sent to a first standard network is currently present in a non-standalone networking formed by a first standard network and a second standard network.

At step S102, if it is determined that the communication request to be sent to the first standard network is currently present, the terminal sends the communication request to the first standard network by using either of a current uplink resource of the first standard network and a current uplink resource of the second standard network.

The terminal determines whether the uplink resource of the first standard network is currently present. If it is determined that the uplink resource of the first standard network is currently present, the terminal sends the communication request to the first standard network by using the uplink resource of the first standard network; and if it is determined that no uplink resource of the first standard network is currently present and when it is determined that the uplink resource of the second standard network is currently present, the terminal sends the communication request to the first standard network by using the uplink resource of the second standard network. For example, the terminal marks the communication request to obtain a communication request marked with a cross-standard scheduling instruction, and sends the communication request marked with the cross-standard scheduling instruction to the second standard network by using the uplink resource of the second standard network, so that the second standard network sends the communication request to the first standard network according to the cross-standard scheduling instruction. An information identification for the cross-standard scheduling instruction may be provided before or after the communication request, or the cross-standard scheduling instruction may be carried in the communication request.

At step S103, the terminal receives, through the first standard network, a communication response sent by the first standard network in response to the communication request, after the communication request is sent to the first standard network.

The method further includes: if it is determined that none of the uplink resource of the first standard network and the uplink resource of the second standard network is currently present, the terminal delaying sending until there is an uplink resource of at least one of the first standard network and the second standard network and then sending the communication request through the network with the uplink resource. Specifically, after the sending is delayed, if the uplink resource of the first standard network is present firstly, the communication request is sent by using the uplink resource of the first standard network; if the uplink resource of the second standard network is present firstly, the communication request is sent by using the uplink resource of the second standard network; and if uplink resources of both the first standard network and the second standard network are present, the communication request is sent by using the uplink resource of the first standard network.

The communication request is a request sent from the terminal to the first standard network, such as a link establishment request, an uplink transmission request, etc. The communication response is a response generated and sent by the first standard network in response to the communication request, such as a link establishment response, a transmission response, etc. In an implementation, if the communication request is an uplink transmission request, the communication response is a transmission response carrying resource authorization information, and the method may further include: the terminal sending uplink data to the first standard network by using the resource authorization information, after receiving, through the first standard network, the communication response sent by the first standard network in response to the communication request. The resource authorization information is allocated to the terminal by the first standard network based on the uplink transmission request, and may include a RB (Resource Block) allocated to the terminal by the first standard network.

In this embodiment, the first standard network may be a 5G TDD network, and thus the uplink resource of the first standard network may be an uplink time slot of the first standard network or an uplink symbol of a special time slot of the first standard network. The second standard network may be an LTE FDD network or an LTE TDD network, and thus the uplink resource of the second standard network includes an uplink time slot of the second standard network.

In the method for quickly establishing communication provided in an embodiment of the present disclosure, when no uplink resource is currently present in the first standard network, a current uplink resource of the second standard network may be used to transmit a communication request of the first standard network, thereby greatly reducing communication latency of the first standard network (such as a 5G TDD network), and enhancing communication efficiency.

Hereafter, the present disclosure will be illustrated in detail, by taking a case in which the first standard network of a NSA is a 5G TDD network, and the second standard network of the NSA is an LTE FDD network or LTE TDD network, and both the uplink resources of the first standard network and the uplink resource of the second standard network are uplink time slots, as an example, with reference to FIGS. 2a to 6b.

FIG. 2a and FIG. 2b are schematic diagrams of a frame structure relationship of 4G and 5G in a common NSA combinatorial network. At present, operators mainly perform deployment according to FIG. 2a, and will still perform deployment according to FIG. 2b in the future. In this embodiment, the LTE FDD and 5G TDD combinatorial network in FIG. 2a is taken as an example. According to a prior scheme, all the 5G-related communications may only be carried out on 5G. FIG. 3a and FIG. 3b show schematic timing diagrams when a terminal uploads data, in which a case where the terminal has data required to be sent to 5G TDD is taken as an example. In a scenario without retransmission as shown in FIG. 3a, since there is no available 5G UL (uplink) resource at a time point (i.e., at Time 0) when the terminal requires to send a request, the actual sending of an uplink data request (or an uplink request, a data request, an uplink transmission request) will be delayed until to a time point (i.e., at Time 4) when there is an available 5G UL resource. After receiving the uplink data request, the 5G network needs a certain period to perform processing. For example, if 3 slots (time slots) are needed for processing, resource information (or resource authorization information, resource allocation information, resource scheduling information, resource scheduling authorization result) may be allocated to the terminal at Time 7, and thus the terminal may indeed complete the uplink data transmission at about Time 9. In a scenario with retransmission as shown in FIG. 3b, assuming that the terminal fails to receive the resource allocation information on the 5G network side at Time 7 due to interference, the terminal will request retransmission. For example, at Time 9, the uplink data request will be retransmitted to continue requesting resources. Therefore, the 5G network will allocate the resource information to the terminal at Time 12, and the terminal will complete the uplink data transmission at about Time 14. It can be seen that, due to the inherent defect of TDD, the terminal cannot send data requests at any time point (i.e. without waiting), resulting in an inevitable waiting latency.

Since 4G and 5G seem to be independent from each other in NSA but incorporate to each other by NSA technology, in an embodiment of the present disclosure, communication between 4G and 5G sides is interactive, instead of isolating communication of the 4G side from the 5G side. In this way, resource characteristics of two different networks may be more effectively utilized to reduce latency of communication establishment, thereby increasing communication speed and enhancing communication efficiency. For a terminal supporting NSA, when the terminal requires to send a communication request on a first wireless standard network but the first wireless standard network now has no corresponding wireless resource (an uplink resource, such as an uplink slot) while a second wireless standard network has a corresponding wireless resource for sending this communication request, the terminal gives up sending this request on the first wireless standard network and turns to send this request on the second wireless standard network, and marks this request as a request with respect to the first wireless standard network. For example, if this request is a resource request, it is marked as a resource request with respect to the first wireless standard network; and when the terminal successfully sends the resource request on the second wireless standard network, a resource authorization response on a network side is monitored on the first wireless standard network. After the terminal has monitored the resource authorization response, it sends a specific request data on a next available wireless resource of the first wireless standard network. If the terminal fails to monitor the resource authorization response on the network side on a certain resource window, the previous process will be repeated until the resource authorization response on the network side is acquired. Correspondingly, for the NSA network, the second wireless standard network may receive a communication request from the first wireless standard network. For example, if this communication request is a resource request, after the first wireless standard network receives the resource request sent by the second wireless standard network, a corresponding resource authorization will be allocated on the first wireless standard network and feedback to the terminal. FIG. 4 is a flowchart of establishing and performing communication between a terminal and a network in an NSA environment, provided in an embodiment of the present disclosure. As shown in FIG. 4, similarly, a case in which the terminal has data required to be sent to 5G TDD is taken as an example, and steps 401 to 409 may be included.

At step S401, the terminal has a data request to be sent to a current wireless network.

At step S402, whether the current wireless network has an uplink resource for sending the request is determined. If the current wireless network has an uplink resource, step S403 is performed to send the request by using the uplink resource of the current wireless network; and if the current wireless network has no uplink resource, step S404 is performed.

At step S404, whether a second wireless network has an uplink resource for sending the request is determined. If the second wireless network has an uplink resource, step S405 is performed to send the request by using the uplink resource of the second wireless network; and if the second wireless network has no uplink resource, step S409 is performed.

At step S406, after the request is sent, resource scheduling information of the current wireless network is monitored.

At step S407, whether effective resource scheduling information has been acquired is determined; and if the effective resource scheduling information has been acquired, uplink data (or uplink data request) are sent on a next available uplink resource of the current wireless network by using the effective resource scheduling information.

At step S409, the sending is delayed to a next slot or sub-frame, and step S402 is re-performed.

It can be seen that, in the embodiment of the present disclosure, when no wireless resource of the first standard network is currently present, the current wireless resource of the second standard network may be used to transmit the communication request of the first standard network, thereby greatly reducing communication latency of the first standard network (such as a 5G TDD network), and enhancing communication efficiency, such that the present disclosure is suitable for 5G NSA terminal products and network products.

In FIGS. 5a, 5b, 6a and 6b below, assuming that the first standard is 5G and the second standard is LTE (TDD or FDD), all the time units shown in the figures are schematic, and are only used to clearly demonstrate the implementations of the present disclosure and optimization for communication latency, but does not mean that such a time arrangement must be followed in a real environment.

FIG. 5a is a schematic timing diagram when a terminal uploads data in a scenario without retransmission in a LTE FDD-5G TDD combinatorial network, provided in an embodiment of the present disclosure; and FIG. 5b is a schematic timing diagram when a terminal uploads in a scenario without retransmission in a LTE TDD-5G TDD combinatorial network, provided in an embodiment of the present disclosure. As shown in FIGS. 5a and 5b, the implementation is as follows with reference to FIG. 4.

At step 1, at Time 0, a terminal requires to send an uplink transmission request, but at this time there is a downlink slot on a 5G side, and then the terminal sends this uplink transmission request to a 4G network by using an uplink slot of 4G FDD/4G TDD.

It should be noted that, the terminal needs to mark this uplink transmission request as a request with respect to a 5G TDD network, for example, an information identification for cross-standard scheduling instruction may be added before the uplink transmission request.

At step 2, after receiving this request, the 4G FDD/4G TDD network identifies that this request is from another wireless standard 5G according to the information identification for cross-standard scheduling instruction. In this case, the 4G FDD/4G TDD network routes this request to another wireless standard 5G TDD. The 5G TDD network immediately learns that the terminal has a resource requirement. After a certain period, the 5G TDD network sends resource information (or a resource scheduling authorization result) to the terminal at Time 2.

At step 3, the terminal may transmit corresponding data at next uplink Time 4 of 5G TDD.

Compared with the conventional scheme as shown in FIG. 3a in which the transmission is completed at Time 9, in this embodiment, the transmission may be completed at Time 4, thereby greatly reducing communication latency.

FIG. 6a is a schematic timing diagram when a terminal uploads data in a scenario with retransmission in a LTE FDD-5G TDD combinatorial network, provided in an embodiment of the present disclosure; and FIG. 6b is a schematic timing diagram when a terminal uploads in a scenario with retransmission in a LTE TDD-5G TDD combinatorial network, provided in an embodiment of the present disclosure. As shown in FIGS. 6a and 6b, the implementation is as follows with reference to FIG. 4.

At step 1, at Time 0, a terminal requires to send an uplink transmission request, but at this time there is a downlink slot on a 5G side, and then the terminal sends this uplink transmission request to a network by using an uplink slot of 4G FDD/4G TDD.

It should be noted that, the terminal needs to mark this uplink transmission request as a request with respect to a 5G TDD network, for example, an information identification for cross-standard scheduling instruction may be added before the uplink transmission request.

At step 2, after receiving this request, the 4G FDD/4G TDD network identifies that this request is from another wireless standard 5G according to the information identification for cross-standard scheduling instruction, and then the 4G FDD/4G TDD network routes this request to another wireless standard 5G TDD. The 5G TDD network immediately learns that the terminal has a resource requirement. After a certain period, the 5G TDD network sends a resource scheduling authorization result to the terminal at Time 2. However, due to some reasons, such as signal interference, the terminal has not monitored this resource information (or the resource scheduling authorization result) at Time 2.

At step 3, at Time 4, the terminal requires to re-send the uplink transmission request. At this time, there is an uplink slot on the 5G TDD side, and thus the terminal sends this uplink transmission request to the 5G TDD network by using the uplink slot of the 5G TDD.

At step 4, after a certain period, the 5G network sends the resource scheduling authorization result to the terminal at Time 7.

At step 5, the terminal transmits corresponding data at next uplink Time 9 of 5G.

Compared with the conventional scheme as shown in FIG. 3b in which the transmission is completed at Time 14, in this embodiment, the transmission may be completed at Time 9, thereby greatly reducing communication latency.

In this embodiment of the present disclosure, the 5G TDD standard is endowed with main advantages of FDD by software upgrading. When applied to an industrial field, the present disclosure can greatly reduce communication latency of 5G TDD (such as a communication link establishment latency, a communication data transmission latency, etc.), and will play a great role in the field of URLLC to a large extent.

Figure 7:
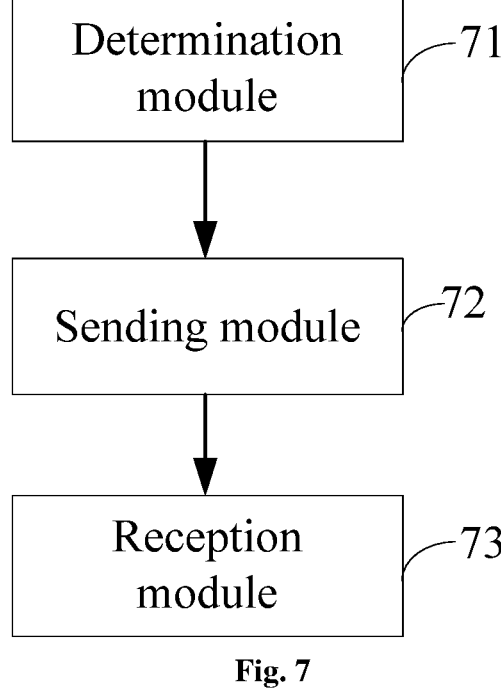
FIG. 7 is a block diagram of a structure of an apparatus for quickly establishing communication, provided in an embodiment of the present disclosure.

FIG. 7 is a block diagram of a structure of an apparatus for quickly establishing communication, provided in an embodiment of the present disclosure. As shown in FIG. 7, the apparatus may include: a determination module 71, a sending module 72, and a reception module 73.

The determination module 71 is configured to determine, in a non-standalone formed by a first standard network and a second standard network, whether a communication request to be sent to the first standard network is currently present.

The sending module 72 is configured to send the communication request to the first standard network by using either of a current uplink resource of the first standard network and a current uplink resource of the second standard network, if it is determined that the communication request to be sent to the first standard network is currently present. The sending module 72 sends the communication request to the first standard network by using the uplink resource of the first standard network, if it is determined that the uplink resource of the first standard network is currently present. When the determination module 71 determines that the uplink resource of the second standard network is currently present and if it is determined that no uplink resource of the first standard network is currently present, the communication request is sent to the first standard network by using an uplink resource of the second standard network. For example, the sending module marks the communication request to obtain a communication request marked with a cross-standard scheduling instruction, and sends the communication request marked with the cross-standard scheduling instruction to the second standard network by using the uplink resource of the second standard network, so that the second standard network sends the communication request to the first standard network according to the cross-standard scheduling instruction. An information identification for cross-standard scheduling instruction may be provided before or after the communication request, or the cross-standard scheduling instruction may be carried in the communication request The reception module 73 is configured to receive, through the first standard network, a communication response sent by the first standard network in response to the communication request, after the communication request is sent to the first standard network.

If the determination module 71 determines that none of an uplink resource of the first standard network and an uplink resource of the second standard network is currently present, the sending module 72 delays sending until there is an uplink resource of at least one of the first standard network and the second standard network, and then sends the communication request through the network with the uplink resource. Specifically, after the sending is delayed, if the uplink resource of the first standard network is present firstly, the communication request is sent by using the uplink resource of the first standard network; if the uplink resource of the second standard network is present firstly, the communication request is sent by using the uplink resource of the second standard network; and if uplink resources of both the first standard network and the second standard network are present, the communication request is sent by using the uplink resource of the first standard network.

The communication request is a request sent to the first standard network, such as a link establishment request, an uplink transmission request, etc. The communication response is a response generated and sent by the first standard network in response to the communication request, such as a link establishment response, a transmission response, etc. In an implementation, if the communication request is an uplink transmission request and the communication response is a transmission response carrying resource authorization information, the sending module 72 sends the uplink data to the first standard network by using the resource authorization information, after the reception module 73 receives, through the first standard network, the communication response sent by the first standard network in response to the communication request. The resource authorization information is allocated to the terminal by the first standard network based on the uplink transmission request, and may include a RB (Resource Block) allocated to the terminal by the first standard network.

In this embodiment, the first standard network may be a 5G TDD network, and the uplink resource of the first standard network may be an uplink time slot of the first standard network or an uplink symbol of a special time slot of the first standard network. The second standard network may be an LTE FDD network or an LTE TDD network, and the uplink resource of the second standard network includes an uplink time slot of the second standard network.

In the apparatus for quickly establishing communication provided in the embodiment of the present disclosure, when no uplink resource of the first standard network is currently present, the current uplink resource of the second standard network may be used to transmit the communication request of the first standard network, thereby greatly reducing communication latency of the first standard network (such as a 5G TDD network), and enhancing communication efficiency.

Figure 8:
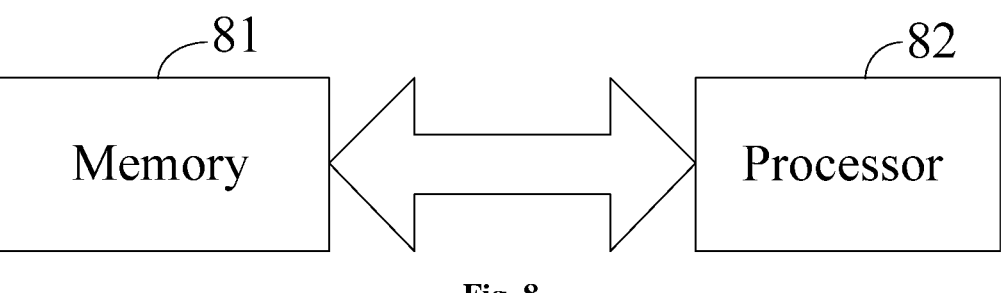
FIG. 8 is a block diagram of a structure of a device for quickly establishing communication, provided in an embodiment of the present disclosure.

FIG. 8 is a block diagram of a structure of a device for quickly establishing communication, provided in an embodiment of the present disclosure. As shown in FIG. 8, the device may include a memory 81, a processor 82, and a program stored in the memory 81 and capable of running on the processor 82. When the program is executed by the processor 82, the method for quickly establishing communication as described above is implemented.

The present disclosure can greatly reduce communication latency of 5G TDD by simple software upgrading without modification of 5G terminals and network hardware, and is suitable for all the 5G terminal products and network products that support 5G NSA.

An embodiment of the present disclosure further provides a storage medium for computer readable storage. The storage medium stores at least one program that can be executed by at least one processor to implement the method for quickly establishing communication as described above.

Those skilled in the art may understand that all or some of the steps in the above-disclosed methods, and functional modules/units in the systems and devices may be implemented as software, firmware, hardware, and appropriate combinations thereof. In a hardware implementation, a division between functional modules/units mentioned in the above description may not necessarily correspond to a division of physical components. For example, a physical component may have multiple functions, or a function or step may be executed by collaboration of several physical components. Some or all of the physical components may be implemented as software executed by processors, such as a central processor, a digital signal processor or a microprocessor, or may be implemented as hardware, or may be implemented as integrated circuits, such as an application-specific integrated circuit. Such software may be distributed on a computer readable medium, which may include a computer storage medium (or a non-temporary medium) and a communication medium (or a temporary medium). As well known by those skilled in the art, the term computer storage medium includes volatile and non-volatile, removable, and non-removable media implemented in any method or technique for storing information (such as computer-readable instructions, data structures, program modules or other data). The computer storage medium includes, but are not limited to a RAM, a ROM, a EEPROM, a flash memory or other storage technology, a CD-ROM, a digital versatile disc (DVD) or other optical disc storage, a magnetic cartridge, a magnetic tape, a disk storage or other magnetic storage device, or any other medium that may be used to store desired information and may be accessed by a computer. In addition, it is well known for those skilled in the art that, the communication medium typically contains computer-readable instructions, data structures, program modules, or other data in modulated data signals such as a carrier signal or other transmission mechanism signal, and may include any information delivery medium.

Based on the method and apparatus for quickly establishing communication, the device, and the storage medium provided in the embodiments of the present disclosure, when no uplink resource of a first standard network is currently present, a current uplink resource of a second standard network may be used to transmit a communication request of the first standard network, thereby greatly reducing communication latency of the first standard network (such as a 5G TDD network), and enhancing communication efficiency.

The preferred embodiments of the present disclosure are illustrated above with reference to the accompanying drawings, but are not intended to limit the scope of protection of the present disclosure. Any modifications, equivalent substitutions and improvements made by those skilled in the art without departing from the scope and spirit of the present disclosure shall be within the scope of protection of the present disclosure.

What is claimed is:

1. A method for quickly establishing communication applied to a terminal, comprising:

determining, in a non-standalone networking formed by a first standard network and a second standard network, whether a communication request to be sent to the first standard network is currently present;

sending the communication request to the first standard network by using either of a current uplink resource of the first standard network and a current uplink resource of the second standard network, in a case where it is determined that the communication request to be sent to the first standard network is currently present, wherein the sending the communication request to the first standard network by using either of the current uplink resource of the first standard network and the current uplink resource of the second standard network, comprises:

determining whether the current uplink resource of the first standard network is currently present;

sending the communication request to the first standard network by using the current uplink resource of the first standard network, in a case where it is determined that the current uplink resource of the first standard network is currently present; and sending the communication request to the first standard network by using the current uplink resource of the second standard network when it is determined that the current uplink resource of the second standard network is currently present, in a case where it is determined that no uplink resource of the first standard network is currently present; and receiving, through the first standard network, a communication response sent by the first standard network in response to the communication request, after the communication request is sent to the first standard network.

2. The method according to claim 1, wherein the sending the communication request to the first standard network by using the current uplink resource of the second standard network, comprises:

marking the communication request to obtain a communication request marked with a cross-standard scheduling instruction; and sending the communication request marked with the cross-standard scheduling instruction to the second standard network by using the current uplink resource of the second standard network, such that the second standard network sends the communication request to the first standard network according to the cross-standard scheduling instruction.

3. The method according to claim 1, further comprising:

in a case where it is determined that none of the current uplink resource of the first standard network and the current uplink resource of the second standard network is currently present, delaying sending until there is an uplink resource of at least one of the first standard network and the second standard network, and sending the communication request through the network with the uplink resource.

4. The method according to claim 3, wherein the delaying sending until there is the uplink resource of at least one of the first standard network and the second standard network, and sending the communication request through the network with the uplink resource, comprises:

sending the communication request by using the uplink resource of the first standard network, in a case where uplink resources of both the first standard network and the second standard network are present.

5. The method according to claim 1, wherein the communication request is an uplink transmission request, the communication response is a transmission response carrying resource authorization information, and the resource authorization information is allocated to the terminal by the first standard network based on the uplink transmission request, and the method further comprises:

sending uplink data to the first standard network by using the resource authorization information, after receiving, through the first standard network, the communication response sent by the first standard network in response to the communication request.

6. The method according to claim 1, wherein the current uplink resource of the first standard network comprises an uplink time slot of the first standard network or an uplink symbol of a special time slot of the first standard network, and the current uplink resource of the second standard network comprises an uplink time slot of the second standard network.

7. The method according to claim 2, wherein the current uplink resource of the first standard network comprises an uplink time slot of the first standard network or an uplink symbol of a special time slot of the first standard network, and the current uplink resource of the second standard network comprises an uplink time slot of the second standard network.

8. The method according to claim 3, wherein the current uplink resource of the first standard network comprises an uplink time slot of the first standard network or an uplink symbol of a special time slot of the first standard network, and the current uplink resource of the second standard network comprises an uplink time slot of the second standard network.

9. The method according to claim 4, wherein the current uplink resource of the first standard network comprises an uplink time slot of the first standard network or an uplink symbol of a special time slot of the first standard network, and the current uplink resource of the second standard network comprises an uplink time slot of the second standard network.

10. The method according to claim 5, wherein the current uplink resource of the first standard network comprises an uplink time slot of the first standard network or an uplink symbol of a special time slot of the first standard network, and the current uplink resource of the second standard network comprises an uplink time slot of the second standard network.

11. A device for quickly establishing communication, comprising: a memory, a processor, and a program stored in the memory and capable of running on the processor, wherein the program is executed by the processor to:

determine, in a non-standalone networking formed by a first standard network and a second standard network, whether a communication request to be sent to the first standard network is currently present;

send the communication request to the first standard network by using either of a current uplink resource of the first standard network and a current uplink resource of the second standard network, in a case where it is determined that the communication request to be sent to the first standard network is currently present, wherein the program is further executed by the processor to implement sending the communication request to the first standard network by using either of the current uplink resource of the first standard network and the current uplink resource of the second standard network, by:

determining whether the current uplink resource of the first standard network is currently present;

sending the communication request to the first standard network by using the current uplink resource of the first standard network, in a case where it is determined that the current uplink resource of the first standard network is currently present; and sending the communication request to the first standard network by using the current uplink resource of the second standard network when it is determined that the current uplink resource of the second standard network is currently present, in a case where it is determined that no uplink resource of the first standard network is currently present; and receive, through the first standard network, a communication response sent by the first standard network in response to the communication request, after the communication request is sent to the first standard network.

12. The device for quickly establishing communication according to claim 11, wherein the program is further executed by the processor to implement sending the communication request to the first standard network by using the current uplink resource of the second standard network, by:

marking the communication request to obtain a communication request marked with a cross-standard scheduling instruction; and sending the communication request marked with the cross-standard scheduling instruction to the second standard network by using the current uplink resource of the second standard network, such that the second standard network sends the communication request to the first standard network according to the cross-standard scheduling instruction.

13. The device for quickly establishing communication according to claim 11, wherein the current uplink resource of the first standard network comprises an uplink time slot of the first standard network or an uplink symbol of a special time slot of the first standard network, and the current uplink resource of the second standard network comprises an uplink time slot of the second standard network.

14. A non-transitory storage medium for computer readable storage, wherein the storage medium stores at least one program executed by at least one processor to:

determine, in a non-standalone networking formed by a first standard network and a second standard network, whether a communication request to be sent to the first standard network is currently present;

send the communication request to the first standard network by using either of a current uplink resource of the first standard network and a current uplink resource of the second standard network, in a case where it is determined that the communication request to be sent to the first standard network is currently present, wherein the at least one program is further executed by the at least one processor to implement sending the communication request to the first standard network by using either of the current uplink resource of the first standard network and the current uplink resource of the second standard network, by:

determining whether the current uplink resource of the first standard network is currently present;

sending the communication request to the first standard network by using the current uplink resource of the first standard network, in a case where it is determined that the current uplink resource of the first standard network is currently present; and sending the communication request to the first standard network by using the current uplink resource of the second standard network when it is determined that the current uplink resource of the second standard network is currently present, in a case where it is determined that no uplink resource of the first standard network is currently present; and receive, through the first standard network, a communication response sent by the first standard network in response to the communication request, after the communication request is sent to the first standard network.

15. The non-transitory storage medium for computer readable storage according to claim 14, wherein the at least one program is further executed by the at least one processor to implement the sending the communication request to the first standard network by using the current uplink resource of the second standard network, by:

marking the communication request to obtain a communication request marked with a cross-standard scheduling instruction; and sending the communication request marked with the cross-standard scheduling instruction to the second standard network by using the current uplink resource of the second standard network, such that the second standard network sends the communication request to the first standard network according to the cross-standard scheduling instruction.

16. The non-transitory storage medium for computer readable storage according to claim 14, wherein the current uplink resource of the first standard network comprises an uplink time slot of the first standard network or an uplink symbol of a special time slot of the first standard network, and the current uplink resource of the second standard network comprises an uplink time slot of the second standard network.

* * * * *